United States Patent [19]

Lichti

[11] Patent Number: 4,687,400
[45] Date of Patent: Aug. 18, 1987

[54] DEVICE FOR MOVING OBJECTS IN A CLOSED CONTAINER

[75] Inventor: Robert Lichti, Lakewood, Calif.

[73] Assignee: Metals, Ltd., Newport Beach, Calif.

[21] Appl. No.: 648,073

[22] Filed: Sep. 7, 1984

[51] Int. Cl.⁴ .............................................. B25J 3/00
[52] U.S. Cl. ............................................ 414/4; 414/8; 414/2; 414/917; 414/733; 414/626; 294/117; 901/36; 901/15; 901/24; 623/62
[58] Field of Search .................. 414/1, 2, 3, 4, 590, 414/626, 7, 8, 6, 5, 917, 726, 729, 732, 733, 738, 739, 589; 901/19, 24, 14, 15, 30, 36; 3/12.5, 12.7, 12.8; 294/117, 106, 119

[56] References Cited

U.S. PATENT DOCUMENTS

| | | |
|---|---|---|
| 1,385,682 | 7/1921 | Haynie ............................... 901/36 X |
| 1,422,468 | 7/1922 | Nicola ................................ 3/12.7 X |
| 3,069,761 | 12/1962 | Sommer ........................... 294/106 X |
| 3,282,442 | 11/1966 | Biggley et al. ......................... 414/7 |
| 3,625,378 | 12/1971 | Attiz ..................................... 414/8 |
| 3,652,117 | 3/1972 | Schroder ........................ 294/117 X |
| 3,927,424 | 12/1975 | Itoh ................................ 294/106 X |
| 4,018,409 | 4/1977 | Burch et al. .................... 294/106 X |
| 4,351,553 | 9/1982 | Rovetta et al. .................... 901/36 X |
| 4,407,625 | 10/1983 | Shum .............................. 414/732 X |
| 4,415,304 | 11/1983 | Tripoli et al. ....................... 414/589 |

FOREIGN PATENT DOCUMENTS

| | | | |
|---|---|---|---|
| 1906310 | 9/1970 | Fed. Rep. of Germany .......... 414/8 |
| 2085399 | 4/1982 | United Kingdom ................. 901/14 |
| 517482 | 7/1976 | U.S.S.R. ................................ 414/7 |
| 642151 | 1/1979 | U.S.S.R. ............................. 414/739 |
| 745672 | 7/1980 | U.S.S.R. ............................. 294/106 |
| 1024272 | 6/1983 | U.S.S.R. ............................... 901/36 |

Primary Examiner—Frank E. Werner
Attorney, Agent, or Firm—Spensley Horn Jubas & Lubitz

[57] ABSTRACT

A device for moving objects about the inside of a closed container includes a grasping mechanism for grasping and releasing objects and an operating mechanism for operating the grasping mechanism and for moving the grasping mechanism about the inside of the container. The operating mechanism includes a pair of arm bodies each of which slidably move through a wall in the container along a linear pathway. As a result of the linear movement of the arm bodies, close tolerance seals can be used to seal the opening sufficiently to allow sliding movement without significantly disturbing the atmspheric and temperature conditions in the container. At least one of the arm bodies is composed of a pair of arm body portions, each portion having a surface slidable with respect to the other portion. The outer ends of the arm bodies positioned outside of the container are suitably coupled to a driver for moving the arm bodies along a linear pathway. The inner ends of the arm bodies are pivotally coupled by a suitable connection to the grasping mechanism. Selective linear movement of the arm bodies, and arm body portions with respect to each other, enables the grasping mechanism to operate and move about the inside of the container in a multiplicity of directions.

5 Claims, 7 Drawing Figures

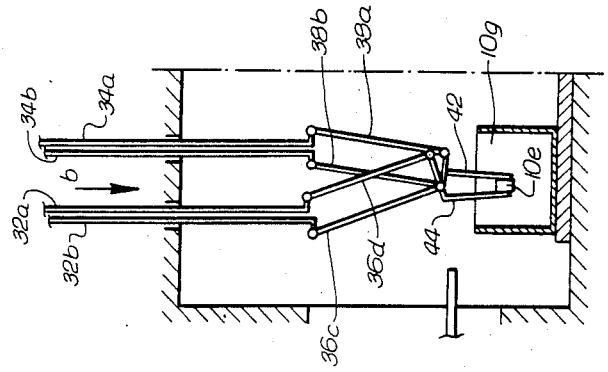
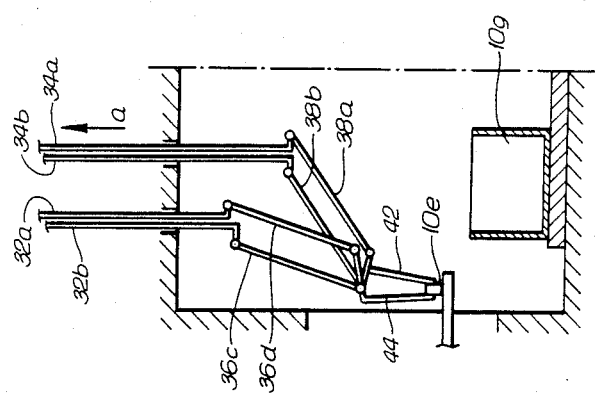
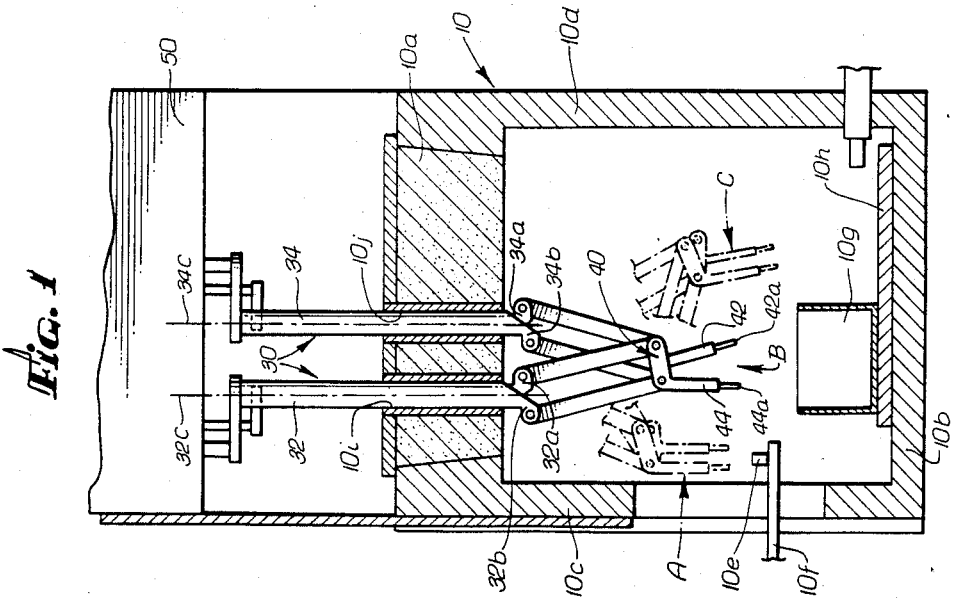

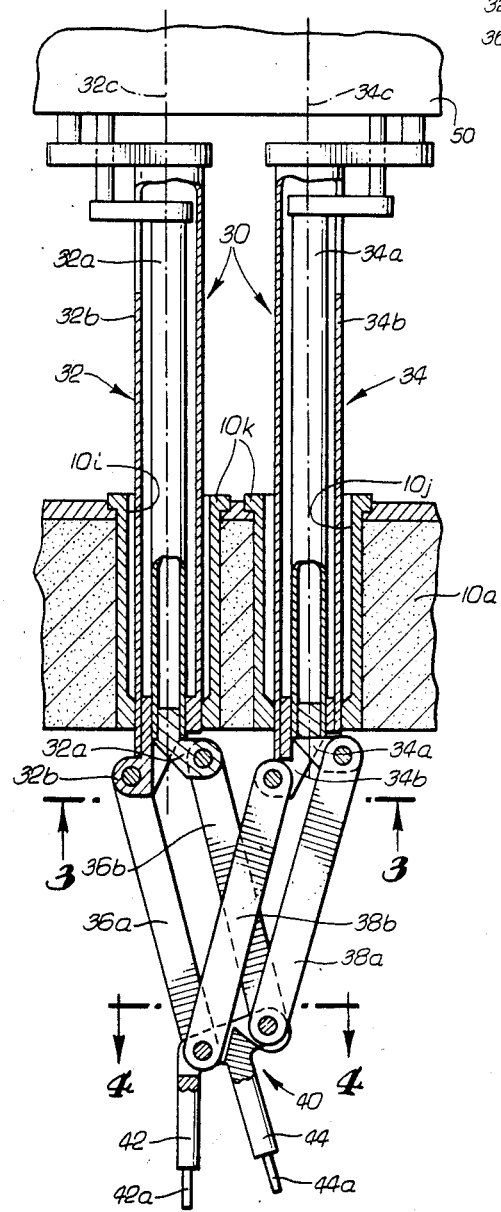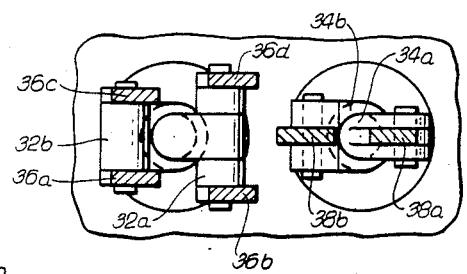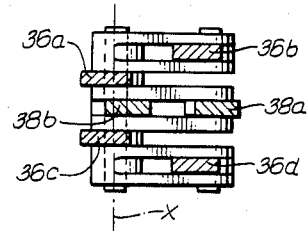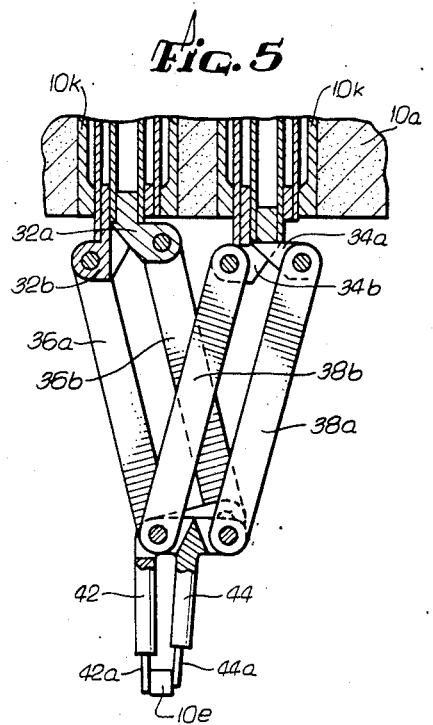

DEVICE FOR MOVING OBJECTS IN A CLOSED CONTAINER

BACKGROUND OF THE INVENTION

1. Field of the Invention

The present invention relates to a device for moving objects about the inside of a container. More particularly, the present invention relates to a device for grasping an object located within a substantially airtight and heated container, moving the grasped object in a multiplicity of directions within the container, and releasing the object at a precise location within the container.

2. Prior Art

In many manufacturing processes, steps are often carried out within a substantially airtight and heated container. Often, an object located at one location inside the container may have to be moved to another location inside the container with the substantially airtight and heated conditions within the container maintained during movement of the object. Obviously, it may not be safe for one to manually move such objects if the container were heated in excess of 120° F., and it may not be economically practical to cool the container to a safe temperature each time the object must be moved. Thus, to eliminate these problems, a robot-type device is typically used to move the object inside heated and airtight containers.

There are several robot-type devices for moving objects within heated and airtight containers. One device includes two straight tubes, each moving linearly through a different wall of the container with the inner ends of the tubes moving in typically perpendicular directions. The inner end of each tube is attached to a simple mechanical clamp. The other end of each tube includes means for operating the clamp. By grasping an object located within the container by one of the clamps and moving the tube connected to that clamp, the object is moved in the same linear direction that the tube inner end moves. To move an object diagonally, this type of robot device requires that one tube clamp grasp the object and move the object vertically, then release the object, and then the other tube clamp grasp the object and move the object horizontally. Thus, obtaining a great variety of non-parallel movements of the object requires complex operation of the tubes and clamps.

Another robot device for moving objects about the inside of a heated and airtight container includes a straight tube passing through a slot in a wall of a container. Attached to one end of the tube is a claw which is located within the container; the other end of the tube being outside the container and connected to means for operating the claw. To move an object grasped by the claw, the tube is pivoted about an axis perpendicular to the tube and passing through the slot in the top of the container. Pivoting of the tube without disturbing the temperature and atmospheric conditions within the container or without causing a significant temperature drop or atmosphere leaks within the container is accomplished by providing a sliding or overlapping plate seal for the tube and the slot. However, sliding plate seals are cumbersome to construct and generally do not provide a consistently tight seal. Moreover, although such a robot device affords annular movement of the claw, it does not afford horizontal and vertical movement of the claw.

SUMMARY OF THE INVENTION

The present invention is directed to a device for grasping and releasing an object located within a container, and for moving the grasped object from one location within the container to another location within the container. The system is specifically designed for application to containers of the type having a heated and controlled atmosphere, where the object is moved about the inside of the container without significantly disturbing the temperature and atmospheric conditions inside the container.

The device includes grasping means for grasping and releasing the object. The grasping means is coupled by a suitable connection to linearly actuated operating means for operating the grasping means and for moving the grasping means in at least two different directions along two different pathways (hereinafter "non-parallel directions") within the container without significantly disturbing the temperature and atmospheric conditions within the container.

The grasping means includes first and second fingers each having opposed first ends, and second ends. The fingers are rotatable about an axis passing through the second end of both fingers. By rotating the first finger about the axis and with respect to the second finger, the opposed first ends of the fingers can come together and spread apart, thus enabling the grasping and releasing of an object.

The operating means includes first and second adjacent arm bodies, each arm body slidably passing through an opening in a wall of the container. Each arm body has an inner end operatively coupled to the grasping means and each arm body is movable along a linear pathway. Since the arm bodies move along linear pathways, close tolerance ceramic or graphite tubes can be used to seal the container opening so as to allow movement of the arm bodies while maintaining the temperature and atmospheric conditions within the container reasonably constant, i.e., within the temperature and atmosphere parameters required by the process being carried out within the container.

Each arm body has an outer end located outside the container and operatively coupled to a linear actuating means for moving the inner end of the arm body along the linear pathway associated with that arm body. Movement of the inner end of both arm bodies the same distance and direction along their respective linear pathways causes the grasping means to move away from the container wall having the opening for the arm, i.e., vertically within the container. Movement of inner end of one arm body with respect to the inner end of the other arm body causes the grasping means to move parallel to that container wall, i.e., horizontally within the container. By selectively controlling the movement of the arm bodies, the present invention facilitates movement of the grasping means in any desired direction in the container. Thus, the present invention uses only vertical linear movement of the operating means arm bodies to obtain horizontal, vertical and virtually any other desired directional movement of the grasping means.

The grasping means is actuated by causing at least one of the grasping means fingers to rotate with respect to the other finger. To rotate the free end of the grasping means fingers about the axis passing through the other end of the fingers and with respect to each other, at least one, and preferably both, of the arm bodies include first and second separate arm body portions each having inner ends suitably connected to the grasping means fingers. The first body portion has a surface slidable with respect to a surface of the second body portion. By sliding the first body portion of one of the arm bodies with respect to the second body portion of that arm body, the first finger is caused to rotate about the grasping means axis and with respect to the second finger to yield grasping and releasing action of the free ends of the fingers. Therefore, by using only linear movement of the arm bodies, and selectively moving the arm body portions, the present invention also provides both transporting and grasping functions in the inside of a container without significantly disturbing the temperature and atmospheric conditions within the container.

DESCRIPTION OF THE DRAWINGS

FIG. 1 is a cross-sectional view of a container provided with the device of the present invention and also showing an object, and a tray, and also showing phantom views of two different orientations of a portion of the present invention.

FIG. 2 is a cross-sectional view of the device of the present invention shown passing through openings in a wall of a container with the grasping means fingers spread apart.

FIG. 3 is a sectional view of the device of the present invention taken along line 3—3 of FIG. 2.

FIG. 4 is a sectional view of the device of the present invention taken along line 4—4 of FIG. 2.

FIG. 5 is a cross-sectional view of the device of the present invention shown like FIG. 2 but with the grasping means fingers grasping an object.

FIG. 6 is a schematic view of the device of the present invention shown grasping an object located at one position in a container.

FIG. 7 is a schematic view of the device of the present invention shown placing a grasped object inside a tray located within the container.

DETAILED DESCRIPTION OF THE INVENTION

The following description is of the presently preferred mode of carrying out the invention. This description is made for the purpose of illustrating the general principles of the invention to teach those skilled in the art to which the invention pertains how to make and use the invention. However, the description is not to be taken in a limiting sense. The scope of the invention is best determined by the appended claims.

Referring to FIG. 1, one embodiment of the device of the present invention is shown and comprises grasping means 40 for grasping and releasing an object and operating means 30 for operating the grasping means, the operating means passing through a top wall 10a of closed container 10. As is described more fully below, parallel linear movement of two operating means arm bodies 32 and 34 through container passageways 10i and 10j allows grasping and releasing movement of the grasping means opposed fingers 42 and 44 together with multi-directional movement of the grasping means 40 about the inside of the container, with the temperature and atmosphere conditions inside the container being maintained at a desirable level during such movements.

The device is shown coupled to a substantially airtight and heated container 10. It should be emphasized that the present invention is directed to a device for moving an object about the inside of the container without significantly disturbing the temperature and atmospheric conditions within the container, i.e., without causing a significant temperature drop or atmosphere leak. Of course, the significance of the temperature drop and atmosphere leak depends upon the temperature and atmosphere parameters required for the process being performed within the container.

The container 10 has top wall 10a, bottom wall 10b and opposed side walls 10c and 10d. Movement of an object within the container from side 10c to side 10d or vice versa is hereinafter referred to as horizontal movement, and movement of an object from top 10a to bottom 10b and vice versa is hereinafter referred to as vertical movement. However, it should be appreciated that the device of the present invention can transport an object in at least two different directions and along two different pathways (hereinafter "non-parallel directions). Thus, the present invention is not limited to horizontal and vertical movement of an object. It also should be appreciated that the container also has front and back walls which are not shown in the illustration, and that the container is of the type that can maintain a heated atmosphere (for example, a temperature in excess of 1,900° F.) and a controlled atmosphere (for example, 95% nitrogen) for a desired length of time during operation of the device.

For purposes of illustrating the utility of the present invention, an object 10e is shown supported by a platform 10f extending through side wall 10c of the container. Tray 10g for receiving the object 10e is shown supported on platform 10h and is shown having an open end extending towards the top wall 10a of the container. As discussed more fully below, linear movement of the operating means 30 provides horizontal, vertical and a variety of such other non-parallel movements of the grasping means 40 together with grasping and releasing movement of the grasping means fingers 42 and 44. Thus, the present invention functions to move the object 10e from the platform 10f to a precise depth in the tray 10g.

Referring also to FIG. 2, the operating means 30 includes first and second arm body assemblies 32 and 34, each assembly slidingly passing through a passageway 10i and 10j, respectively, formed in the top wall 10a of the container. Arm body assembly 32, and preferably also arm body assembly 34, includes first and second arm body portions, 32a–b and 34a–b, respectively, with each arm body portion having an outer end located outside of the container and an inner end located inside the container. Also, with respect to each arm body assembly, each arm body portion has a surface slidable with respect to a surface of the other arm body portion. As discussed more fully below, movement of one arm body portion with respect to the other arm body portion of the same arm body assembly enables grasping and releasing movement of the grasping means fingers.

The outer end of each arm body portion is suitably connected to a source 50 for independently moving the arm body portions 32a–b and 34a–b along a linear pathway 32c and 34c, respectively, with the pathways 32c and 34c preferably being parallel and preferably passing through the center of the respective container passageways 10i and 10j. As discussed below, the linear arrangement of the arm body portions ensures that the present invention can operate without significantly affecting the temperature and atmosphere conditions in the container.

Any source of mechanical power 50 can be used so long as the source can linearly move the arm body assemblies. For example, the source can include, but is not limited to, a plurality of stepper motors. Preferably, each arm body portion is independently movable so that each arm body portion can be selectively moved.

In the preferred embodiment shown in FIGS. 1 and 2, the operating means arm body portions consist of a pair of concentric tubes 32a–b and 34a–b. The arm body portions could also be elongated bars, tubes having a semicircular cross section, or any other pair of similar bodies wherein one of the pair has a surface slidable with respect to a surface of the other of the pair, and the term "tube" as used in this application includes such alternate structures.

As shown, tube 32a is slidable within tube 32b, and tube 32b is slidable within the linear passageway 10i. Likewise, tube 34a is slidable within tube 34b, and tube 34b is slidable within the linear passageway 10j. The passageways include close tolerance ceramic or graphite tubes 10k which allow linear movement of the tubes 32b and 34b within the passageways 10i and 10j without significantly affecting the temperature and atmospheric conditions within the container 10.

With reference also to FIG. 3, the inner end of each of the operating means arm body portions 32a–b and 34a–b is pivotally connected to first and second hand assemblies 36 and 38. The first hand assembly 36 is pivotally coupled to arm body assembly 32 and includes two pairs of parallel bars 36a–b and 36c–d. The second hand assembly 38 includes a pair of parallel bars 38a–b, with the plane occupied by the bars 38a–b located parallel to and between the plane occupied by the bars 36a–b and 36c–d. Each bar 36a–d and 38a–b has an upper end closer to the container top and a lower end. The upper end of each of the bars 36a–d and 38a–b is pivotally connected to the inner end of the arm body portions 32a–b and 34a–b, respectively. As discussed more fully below, the lower end of the bars 36a–d and 38a–b is pivotably connected to the grasping means 40.

As a result of the pivotal connection of the parallel bars, if either pair of arm body portions is moved along the respective linear pathway and with respect to the other pair of arm body portions, the grasping means 40 moves horizontally. For example, as shown in phantom in FIG. 1, if arm body 32 is moved along linear pathway 32c and towards the bottom container wall 10b while arm body 34 is kept stationary, the grasping means 40 moves from position "B" to position "C." And, if arm body 34 is moved along linear pathway 34c and towards the container wall 10b when arm body 34 is kept stationary, the grasping means 40 moves from position "B" to position "A." Thus, by moving the arm bodies 32 and 34 only linearly in one direction along one pathway, one obtains movement of the grasping means 40 in at least two directions along two pathways, at least one of the pathways being different from the pathways along which the arm bodies move. It should thus be appreciated that the present invention utilizes the parallel linear movement of the arm body portions to obtain movement of the grasping means in a multiplicity of non-parallel directions.

With reference also to FIGS. 4 and 5, the grasping means 40 includes first and second elongated fingers 42 and 44, each of which have opposed free ends 42a and 44a for grasping object 10e. In one embodiment of the present invention, first finger 42 is pivotally coupled to the lower end of bars 36a–d. Second finger 44 is pivotally coupled to the lower end of bars 38a–b. The free end 44a is rotatable about an axis "x" passing through the lower ends of the bars 36a, 36c and 38b. By moving arm body portion 34a with respect to arm body portion 34b, bar 38a is moved with respect to bar 38b which in turn causes free end 44a to be rotated about axis "x," thereby moving free end 44a closer to free end 42a. Since movement of the free ends is caused by linearly moving the arm body portions with respect to each other, parallel linear movement of the operating means arm assembly bodies also provides grasping and releasing movement of the fingers.

With reference to FIGS. 2, 5, 6 and 7, operation of the device of the present invention will now be more fully described. In comparing FIG. 2 with FIG. 5, FIG. 5 shows that the relative position of the inner end of the arm body portions 32a–b has not changed; however, the relative position of the inner end of the arm body portions 34a–b has changed. That is, the arm body portion 34a, or with respect to the embodiment shown in FIGS. 1 and 2 the inner tube of the second operating means 34, has moved with respect to the arm body portion 34b, or the outer tube of the second operating means 34. Also, bar 38a has moved parallel, and with respect, to bar 38b. As a result, the second finger 44 is pivoted about the axis "x" thereby moving the free end 44a of the second opposed finger 44 closer to the free end 42a of the first opposed finger 42. As a result, the object 10e can be grasped. By performing the reverse steps, the position of the opposed fingers shown in FIG. 2 is obtained thereby facilitating the release of the object 10e.

With reference to FIGS. 6 and 7, diagrammatic views of the present invention are shown so that it can be appreciated how only linear movement of the arm body portions yields vertical, horizontal and other non-parallel movements of the grasping means, and grasping and releasing motion of the grasping means. In FIG. 6, the device of the present invention is shown with the free ends of the first and second opposed fingers 42 and 44 grasping the object 10e. To move the object from the position shown in FIG. 6 to the position shown in FIG. 7, the following steps are performed, preferably by actuating the linear actuating means for moving the arm bodies (not shown) by a suitable logic control:

(1) Without moving the arm body portions of one arm body with respect to each other, arm body 32 is not moved but arm body 34 (including both arm body portions 34a–b) is moved vertically upward (direction "a") and along a linear pathway thereby moving the grasping means (still holding the object 10e) over the top of the openended tray 10g.

(2) Both arm bodies 32 and 34 (including both of their arm body portions) are then vertically lowered (direction "b") along a linear pathway so that the object 10e is placed at a desired precise depth within the tray 10g.

(3) Arm body portion 34a is moved vertically upward (direction "a") with respect to arm body portion 34b thereby spreading apart the two fingers 42 and 44.

(4) The object is then released at the precise depth desired within the tray 10g and by moving both of the arm bodies vertically upward (direction "a") and along a linear pathway, the grasping means of the device of the present invention can be brought out of the tray 10g.

In summary, the present invention provides a device for grasping and releasing an object located within a container, and for moving the grasped object from one location within the container to another location within the container. Since the means for grasping and releasing the object include two linearly moving operating members, close tolerance ceramic or graphite tubes can be used to seal the container opening so as to allow movement of the arm bodies while maintaining the temperature and atmospheric conditions within the container reasonably constant. It should be appreciated that by selectively moving the arm bodies and/or the arm body portions with respect to each other, one can obtain, in addition to horizontal and vertical movement of the grasping means, diagonal movement, annular movement and a multiplicity of other directional movements depending solely upon selective linear movement of the arm bodies and arm body portions.

What is claimed is:

1. A device for moving an object located within a container from one location within the container to another location within the container, the device comprising:

grasping means for grasping and releasing the object when actuated, the grasping means extending from a wall of the container and being positioned inside the container; and operating means for actuating the grasping means and for moving the grasping means in two different directions along two different pathways within the container, the operating means comprising first and second parallel arm elements, each passing through an opening in a wall of the container and having an inner end located within the container and an outer end located outside of the container, said operating means further comprising pivotal link means for operatively coupling the arm element inner ends to the grasping means, wherein the arm elements are independently and axially movable through the openings to cause the inner ends to move along linear pathways and are constrained against movement other than said axial movement;

wherein selective movement of the inner end of the arm elements along their corresponding linear pathways causes the grasping means to move within the container in two different directions along two different pathways.

2. A device according to claim 1 wherein the grasping means includes first and second fingers having opposed free ends.

3. A device for grasping an object located within a container and for moving the object from one location within the container to another location within the container, the container of the type which has a controlled environment during use, the device comprising:

first and second finger elements each pivotally interconnected and having a free end, the free end of the first finger element opposing the free end of the second finger element;

finger control means comprising a plurality of bars pivotally connected to the finger elements, said finger control means for pivoting the first and second finger elements to move the free ends away from and towards each other thereby facilitating the grasping and releasing of objects; and actuator means, connected to the finger control means, for moving the control means to impart pivotal movement to the finger elements, said actuator means including first and second actuator arms each passing through an opening in the container and being independently movable solely in parallel linear pathways, the linear motion of the actuator arms resulting in pivoting motion of the finger elements toward and away from each other to grasp or release said object, respectively;

wherein the finger control means and actuator means further have means for moving the object from one location within the container to another location within the container.

4. A device for moving an object located within a container from one location within the container to another location within the container, comprising:

first, second, third and fourth elongated parallel actuator arms, wherein each arm extends through an opening in the container and is axially movable and is constrained against translational motion other than axial motion;

first, second, third and fourth bars pivotally connected to the ends of the first, second, third and fourth actuator arms within the container, respectively; and a finger mechanism including first and second finger elements each having a base portion and a finger portion and pivotally connected with respect to each other so that the finger portions are movable toward and away from each other, wherein each bar has a free end and the free ends of the first and second bars are pivotally connected to the base portion of the first finger element and the free ends of the third and fourth bars are pivotally connected to the base portion of the second finger element, wherein translational movement of the finger mechanism along a path which is not parallel to the axes of the actuator arms and pivoting of the finger elements is achieved by selectively moving the actuator arms in the axial direction.

5. The assembly of claim 4 wherein the actuator arms are tubular and wherein the first actuator arm is coaxial with the second actuator arm and slidable within the second actuator arm and wherein the third actuator arm is coaxial with the fourth actuator arm and slidable within the fourth actuator arm.

* * * * *